United States Patent
Candelaria et al.

(10) Patent No.: US 7,941,574 B2
(45) Date of Patent: May 10, 2011

(54) CKD PARTIAL RECORD HANDLING

(75) Inventors: Susan Kay Candelaria, Tucson, AZ (US); Roger Gregory Hathorn, Tucson, AZ (US); Matthew Joseph Kalos, Tucson, AZ (US); Beth Ann Peterson, Tucson, AZ (US); Roman Yusufov, Tucson, AZ (US)

(73) Assignee: International Business Machines Corporation, Armonk, NY (US)

( * ) Notice: Subject to any disclaimer, the term of this patent is extended or adjusted under 35 U.S.C. 154(b) by 213 days.

(21) Appl. No.: 12/189,578

(22) Filed: Aug. 11, 2008

(65) Prior Publication Data
US 2010/0036977 A1 Feb. 11, 2010

(51) Int. Cl.
G06F 13/28 (2006.01)
(52) U.S. Cl. .......................................... 710/24; 707/718
(58) Field of Classification Search .................... 710/24; 707/718
See application file for complete search history.

(56) References Cited

U.S. PATENT DOCUMENTS

| 5,016,160 | A | | 5/1991 | Lambeth et al. |
| 5,613,162 | A | | 3/1997 | Kabenjian |
| 5,664,224 | A | * | 9/1997 | Davis ............................. 710/22 |
| 5,721,898 | A | * | 2/1998 | Beardsley et al. .................... 1/1 |
| 6,088,517 | A | | 7/2000 | Wanner et al. |
| 6,463,059 | B1 | * | 10/2002 | Movshovich et al. ........ 370/389 |
| 6,678,755 | B1 | * | 1/2004 | Peterson et al. ................ 710/24 |
| 7,133,940 | B2 | | 11/2006 | Blightman et al. |
| 7,640,376 | B2 | * | 12/2009 | Arataki et al. .................. 710/22 |
| 2005/0114561 | A1 | * | 5/2005 | Lu et al. ......................... 710/24 |
| 2006/0179176 | A1 | | 8/2006 | Dhong et al. |

* cited by examiner

Primary Examiner — Henry W Tsai
Assistant Examiner — Elias Mamo
(74) Attorney, Agent, or Firm — Griffiths & Seaton PLLC

(57) ABSTRACT

A method for combining partial records into a single direct memory access (DMA) operation for a count key data (CKD) protocol in a computer environment is provided. In an initiator processor of the computer environment, a number of the partial records to be prefetched is determined by gathering a plurality of descriptor information for a command according to a predetermined algorithm having a plurality of assumptions for the command. The number of partial records is prefetched. At least one of record headers and record keys of the number of partial records are concatenated into the single DMA operation. The DMA operation is forwarded to a receiver process to be completed.

17 Claims, 4 Drawing Sheets

CKD PARTIAL RECORD HANDLING

BACKGROUND OF THE INVENTION

1. Field of the Invention

The present invention relates in general to computers, and more particularly to a mechanism for combining portions of records into a single DMA operation to increase processing efficiency.

2. Description of the Related Art

Data storage systems, or disk storage systems, are utilized to process and store data. A storage system may include one or more disk drives. The disk drives may be configured in an array, such as a Redundant Array of Independent Disks (RAID) topology, to provide data security in the event of a hardware or software failure. The data storage systems may be connected to a host, such as a mainframe computer. The disk drives in many data storage systems have commonly been known as Direct Access Storage Devices (DASD).

DASD requires certain Input/Output functions in order to serve its function as permanent data storage for the host. An I/O channel typically connects the DASD and the host processor. The host processor operating system initiates data transfer with a command to the I/O channel. This is done by a series of Channel Command Words (CCW's) that may be forwarded to a control unit (DASD controller), for example. The controller interprets the CCW's and commands the DASD to execute the commands. For example a "SEEK" command positions a DASD access mechanism, "SEARCH" commands cause comparison between data sought by the host and data physically stored on the device, a "WRITE" command transfers data from the host to the DASD, and a "READ" command copies data from DASD to the host.

DASD devices typically store data on a track, which is a circular path on the surface of a disk on which information is recorded and from which recorded information is read. Typically these disk drives implement a Count, Key, and Data (CKD) format on the disk drives. For a detailed explanation of CKD architecture, see for example, Marilyn Boyl, Introduction to IBM Direct Access Storage Devices, Science Research Associates Inc., 1981. The format contains a definition of how data is structured in the records contained on the track. A record is a set of one or more related data items grouped together for processing, such that the group may be treated as a unit. Disk drives utilizing the CKD format have a special "address mark" on each track that signifies the beginning of a record on the track. After the address mark is a three-part record beginning with the count field that serves as the record ID and also indicates the lengths of the optional key field and the data field, both of which follow. Also on the track, there is normally one Home Address (HA) that defines the physical location of the track and the condition of the track. The HA typically contains the physical track address, a track condition flag, a cylinder number (CC) and a head number (HH). The combination of the cylinder number and the head number indicates the track address, commonly expressed in the form CCHH. The HA contains the "physical track address" which is distinguished from a "logical track address." Some operating systems, such as the IBM Virtual Machine (VM) operating system, employ a concept of "virtual disks" referred to as user mini-disks, and thus it is necessary to employ logical addresses for the cylinders rather than physical addresses. The first record following the HA is commonly a track descriptor record, sometimes referred to as Record 0, or R0. One or more user records follow R0 on the track. The R0 record contains no key field, but may contain either system or user data. The first part of each user record is an "address marker" that enables the controller to locate the beginning of the record when reading data.

SUMMARY OF THE INVENTION

CKD protocols generally require greater processor resources than small computer systems interface (SCSI) protocols. This is at least partially because CKD architectures operate on individual records as opposed to SCSI which specifies a start block and block count. Various changes have been made at a protocol level to improve the ability to batch records together to improve throughput. For example, at a command level, commands such as "Read Track Data" and "Write Track Data" allow the control unit to operate on a track boundary.

CKD semantics and well-structured code requires control units to continue to process commands serially, since the results of one command may change the execution of, or prevent the execution of, a subsequent command. This serial execution may cause longer latencies, particularly since each command typically requires one or more direct memory access (DMA) operation to complete. On a multiplexed interface where multiple operations are executing concurrent DMA operations, the latencies may be come intolerably high.

In light of the foregoing, a need exists for a mechanism for "batching" DMA operations for a track to improve throughput, and ultimately, processing performance. Accordingly, in one embodiment, by way of example only, a method for combining partial records into a single direct memory access (DMA) operation for a count key data (CKD) protocol in a computer environment is provided. In an initiator processor of the computer environment, a number of the partial records to be prefetched is determined by gathering a plurality of descriptor information for a command according to a predetermined algorithm having a plurality of assumptions for the command. The number of partial records is prefetched. At least one of record headers and record keys of the number of partial records are concatenated into the single DMA operation. The DMA operation is forwarded to a receiver process to be completed.

In an additional embodiment, again by way of example only, a system for combining partial records into a single direct memory access (DMA) operation for a count key data (CKD) protocol in a computer environment is provided. An initiator processor is operable in the computer environment. A number of the partial records to be prefetched is determined by gathering a plurality of descriptor information for a command according to a predetermined algorithm having a plurality of assumptions for the command. The number of partial records is prefetched. At least one of record headers and record keys of the number of partial records are concatenated into the single DMA operation. The DMA operation is forwarded to a receiver process to be completed.

In still another embodiment, again by way of example only, a computer program product for combining partial records into a single direct memory access (DMA) operation is provided. The computer program product comprises a computer-readable storage medium having computer-readable program code portions stored therein. The computer-readable program code portions comprise a first executable portion for determining in an initiator processor of the computer environment a number of the partial records to be prefetched by gathering a plurality of descriptor information for a command according to a predetermined algorithm having a plurality of assumptions for the command, a second executable portion for prefetching the number of partial records, a third executable portion for concatenating at least one of record headers and record keys of the number of partial records together into the single DMA operation, and a fourth executable portion forwarding the DMA operation to a receiver process to be completed.

BRIEF DESCRIPTION OF THE DRAWINGS

In order that the advantages of the invention will be readily understood, a more particular description of the invention briefly described above will be rendered by reference to specific embodiments that are illustrated in the appended drawings. Understanding that these drawings depict only typical embodiments of the invention and are not therefore to be considered to be limiting of its scope, the invention will be described and explained with additional specificity and detail through the use of the accompanying drawings, in which.

DETAILED DESCRIPTION OF THE DRAWINGS

The following description and claimed subject matter present exemplary embodiments of a mechanism for determining when direct memory access (DMA) commands for multiple records may be combined into a single DMA operation to make more efficient use of processor resources (i.e., fewer dispatches) and bus resources (having more efficient DMAs), to achieve better latency and throughput.

Figure 1:
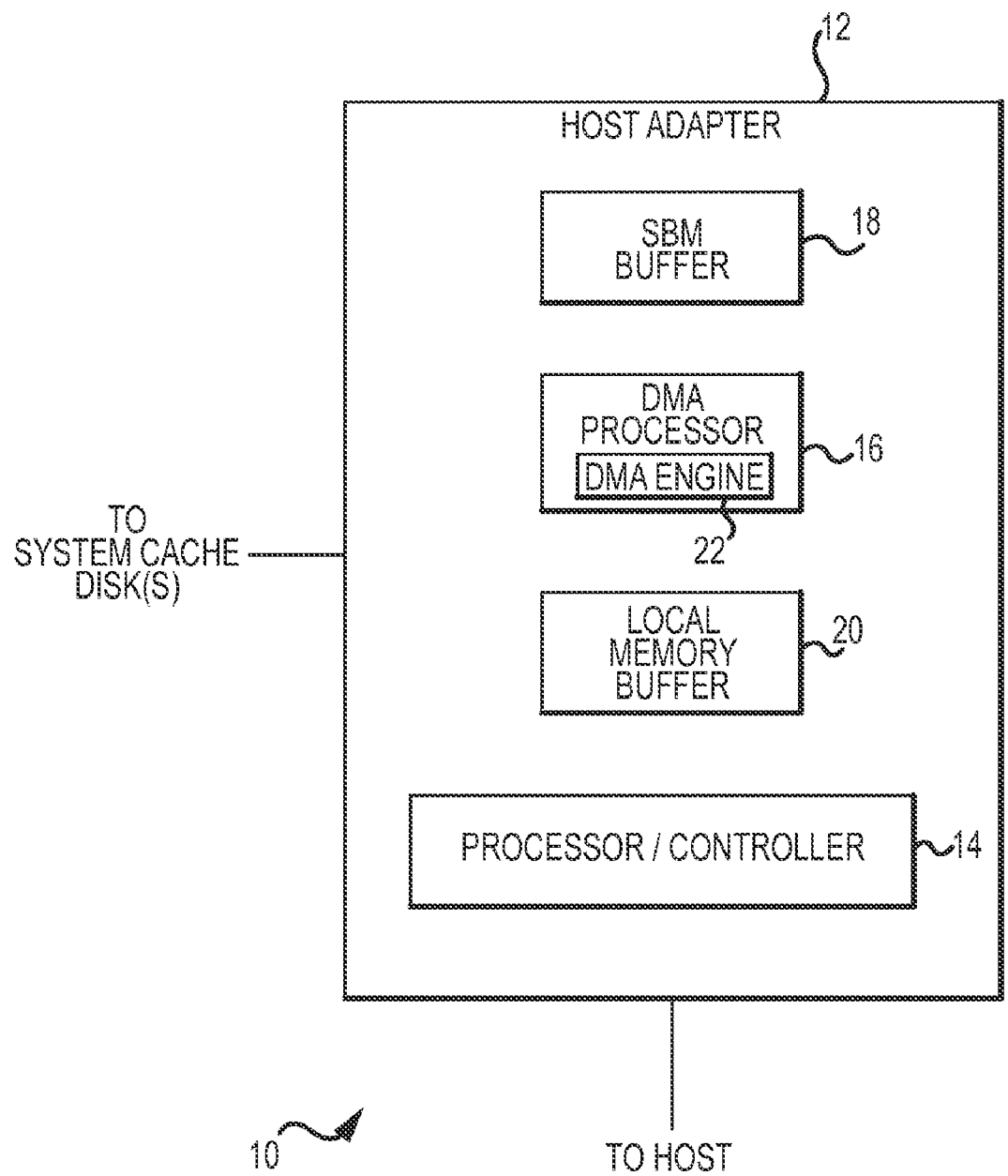
FIG. 1 depicts an exemplary processing environment incorporating and using one or more aspects of the present invention.

Turning to FIG. 1, a block diagram of an exemplary portion 10 of a storage system is illustrated. Storage system portion 10 includes a host adapter 12 configured to be operational on the storage system. As one skilled in the art will appreciate, various subcomponents as will be presently described may be physically associated with the host adapter 12 or otherwise associated with the host adapter 12. For example, a memory component as will be described need not be physically incorporated into the host adapter 12, but may be located elsewhere yet associated with the host adapter 12. Generally, the adapter 12 provides an interface between the storage system (e.g., disk drives and system cache memory) and the host (e.g., mainframe computer).

A variety of subcomponent modules may be associated with host adapter 12, such as a processor/controller module 14 and a DMA processor module 16. A sequence buffer memory (SBM) buffer module 18 is associated with the controller module 14. The processor module 14 may be associated with local memory buffer module 20, where portions of record field(s) are stored. In addition, DMA processor module 16 may be associated with a DMA engine module 22 as shown, which may comprise hardware, software, firmware, or a combination thereof to perform DMA operations. The skilled artisan will appreciate that portion 10 may include one or more components acting as an initiator processor. The initiator processor may be adapted to implement aspects of the mechanism described previously. In addition, portion 10 may include one or more components acting as a receiver process for receiving and executing on the DMA operations forwarded by the initiator processor, such as DMA engine module 22.

A series of software instructions may be executed on the processor/controller 14, the DMA processor 16, or elsewhere. The software instructions may take the form of a computer program product having computer-readable software code comprising a series of executable portions to carry out various steps and techniques in the present description. The computer program products may be stored on a hard disk drive, a compact disk (CD), a digital versatile disk (DVD) a tape medium, or another format.

CKD write operations often involve reading data from a controller's cache. Two examples are search operations, which compare data from a host to count or key fields in the controller cache, and operations that update only the data field of one or more CKD records.

To perform a search, the search parameter is received from the host and the count or key field (for search id or search key respectively) is read with a DMA chain from the controller cache. If the first record satisfies the search, there is usually no requirement to search subsequent records on the track. If the search is not satisfied, a typical input/output (I/O) pattern will cause the search to be executed on subsequent records on the track. A clue (repeat execution) is provided in fibre connectivity (FICON) frames that can be used to determine whether a repetitive search is required.

Write operations that only touch the data field also have to perform read access to the count and key fields in cache. The CKD record header contains addressing information that should be checked on every operation as an integrity check. Such an integrity check requires a fetch of the record header. The record header contains addressing information that should be checked on every operation for integrity. The record header also is used to mark records as bad. These bad record bits are required to be managed on each operation.

In addition, while performing mirrored writes, full records have to be written to the mirrored copy. This full record write is required so that if the first copy is lost, the mirrored copy can be written directly to disk without requiring any read operations from disk to fill out partial CKD records. Both of the access patterns (search and write operations) require fetching of record headers and/or keys. The exemplary embodiments as will be further described below determine whether to prefetch multiple record headers and/or keys, and how many of the headers and/or keys to prefetch.

Since search operations are often satisfied by the first record, it would be inefficient to fetch many records whenever a search command is detected. There are also track formats that have an unusually large number of user records per track (e.g., 93 in one format). For those track formats, a large number of DMA descriptors and control blocks would be required. With the foregoing considerations in mind, the initiator processor may be adapted to intelligently determine, based on a particular DMA operation/command, whether to prefetch and combine partial records based on descriptor information for the operation/command. For each DMA operation, an algorithm may be implemented for the initiator processor to follow when making such determinations. The algorithm may include one or more assumptions about how the determinations should be made.

An algorithm for determining whether to batch DMA operations for a search command may include the following assumptions, for example: (1) two search commands are only considered consecutive if they are the same command. That is, differing types of search commands such as "Search Key" and "Search ID" are not consecutive with each other, (2) search commands are not consecutive if separated by a read/write type command, (3), the first search command in a chain is assumed to not require access to more than one record; only one partial record is therefore prefetched, and (4), the second and subsequent search operations are assumed to not be satisfied by the next record; multiple partial records are prefetched. For Search ID operations, only record headers are prefetched. Search Key operations prefetch both the record headers and the record keys.

Figure 2:
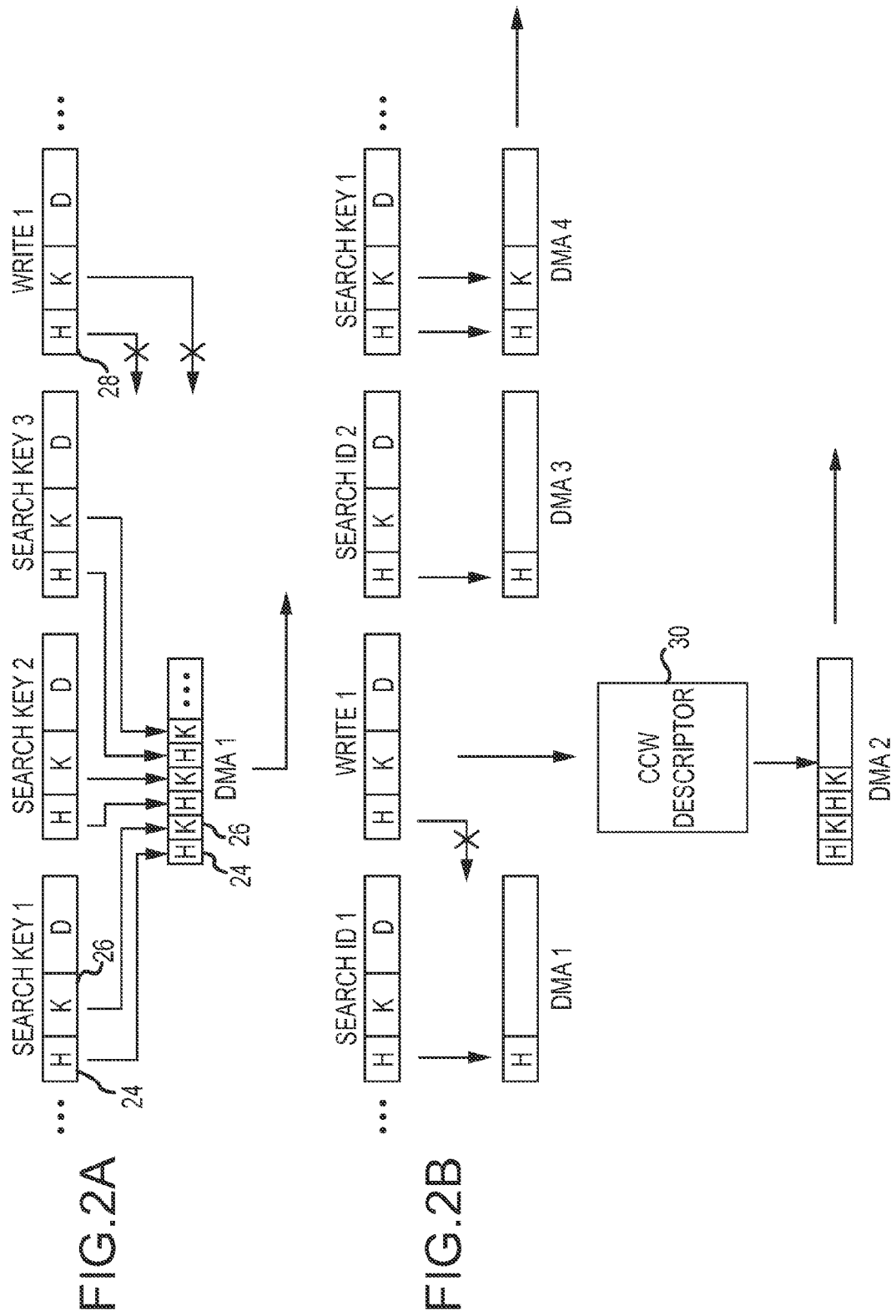
FIG. 2 depicts exemplary partial record handling.

FIGS. 2A and 2B, following, illustrate partial record handling functionality in various exemplary embodiments. The skilled artisan will appreciate that the block diagrams illustrated are for conceptual purposes and may not schematically (technically) represent a data map, for example.

FIG. 2A conceptually illustrates the partial record handling functionality described above in a first example. A number of DMA operations/commands are shown, including three Search Key operations in sequence, followed by a write operation. Each DMA operation includes record header (H) information and key (K) information. As shown, since the Search Key operations are involved, both record header 24 and record key 26 information is gathered for each successive record. The header 24 and key 26 information is concatenated into a single DMA operation as shown, while the header information 28 for the write command is batched for separate operation. The single DMA operation is then forwarded for processing.

For write data operations, hints may be provided in locate record parameters and in a device command word (DCW) list for how many records on a track are likely to be accessed. If more than one record is specified, multiple partial records will be prefetched.

Figure 3:
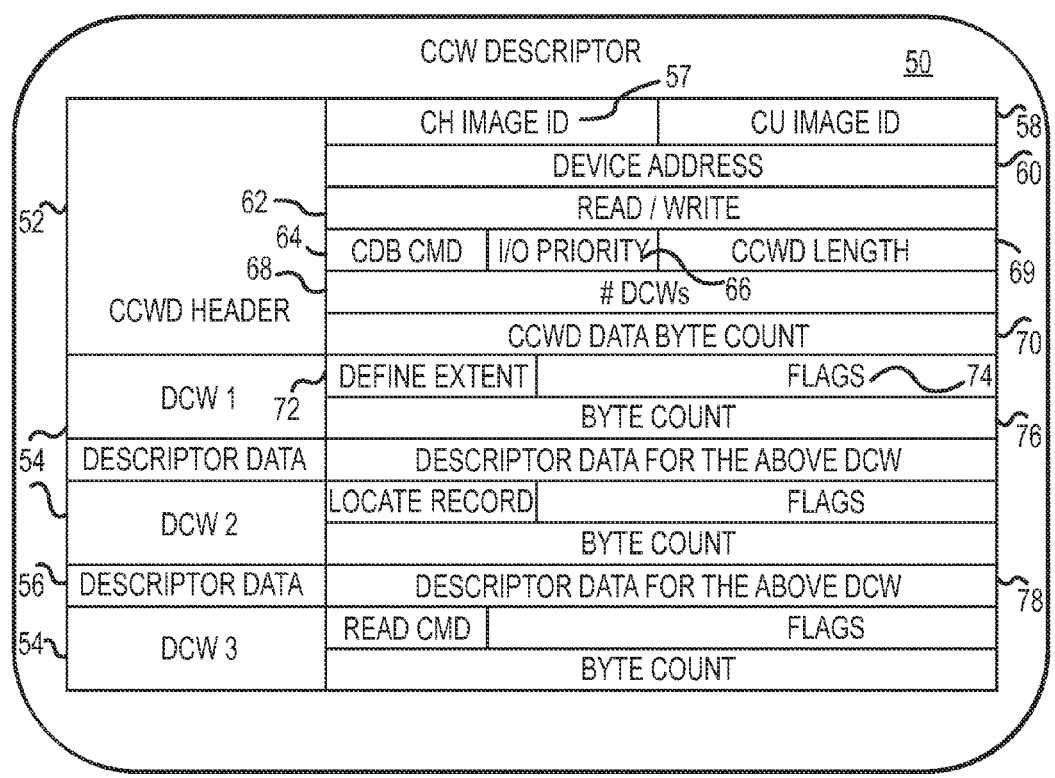
FIG. 3 depicts an exemplary channel command word (CCW) descriptor.

Turning to FIG. 3, an exemplary CCW descriptor (CCWD) 50 is illustrated, containing a list of DCWs as shown. CCW descriptor 50 includes the multiple commands to be executed by the control unit. The commands are executed independent of channel, in that status relative to execution of the individual commands is not tracked by the channel. The control unit receives the multiple commands as a single unit and has the responsibility of executing the commands, in an appropriate manner.

CCWD 50 has three main parts, including, for instance, a header 52, multiple DCWs 54 and descriptor data 56, each of which is described below. CCWD header 52 includes the following fields, as one example:

a) Channel Image Id 57: This field identifies the channel involved in the communication;
b) Control Unit Image Id 58: This field identifies the control unit communicating with the channel identified by channel image id 57;
c) Device Address 60: This field identifies the device coupled to the control unit that is involved in the I/O communications;
d) Read or Write field 62: This field indicates whether the I/O operations are read or write;
e) CDB CMD 64: This field is used to identify this as a CCWD;
f) I/O Priority 66: This field indicates the priority of this I/O;
g) CCWD Length 69: This field indicates the length of the CCWD;
h) # DCWs 68: This field indicates the number of device command words for this CCWD; and
i) CCWD Data Byte Count 70: This field describes the total customer data to be transferred by the CCWD.

Each device command word 54 includes a plurality of fields, such as, for instance:

a) Command Field 72: This field includes the CCW command (e.g., control commands like define extent and locate record; read; write; etc.);
b) Flag Field 74: This field may include one or more flags. In this example, flag field 74 includes a command chain flag indicating whether command chaining is present, and a descriptor data present flag indicating whether descriptor data is present in the CCWD following this DCW. This flag is active for write control, when the write control command requires descriptor data;
c) Byte Count Field 76: If this is a control command, the count is the number of bytes of control data in the CCWD; otherwise, it is the count of customer data to be transferred by this DCW. If the DCW command is a command intermediate or a no op command, the byte count field is zero.

Descriptor data 78 includes the data for a DCW write control command. This data is in the CCWD following the DCW the data is for and its presence is made known by the flag field in the DCW. By specifying control data directly in the descriptor list, the device can obtain the data without requiring the device to perform a separate data transfer to obtain it.

Returning to FIG. 2B, partial record handing using DCW information is illustrated in a second example. In the depicted example, a Search ID command is followed by a Write command, an additional Search ID command, and a Search Key command. The record header information from the first Search ID command is placed into a first DMA command. For the subsequent Write command, the CCW descriptor 30 is consulted for descriptor information. As a result, header and key information representative of the Write command (as well as information from additional partial records not shown) is concatenated into the second DMA command.

On read and write operations, header information may be used to check orientation and validity of the record. For instance, header information may be utilized to verify that the physical location of the record on the track matches an expected orientation. Header information may further be used to verify the format of each record as matching the expected format in metadata.

Because the second Search ID command is separated from the first Search ID command by a Write operation, the header information from the second Search ID command is placed into the third DMA operation, and not the first. This is, again, per the search algorithm described above. In addition, and also per the search algorithm, because the Search ID command and subsequent Search Key commands are different, they are not consecutive. As a result, header information and key information from the Search Key command are placed into the fourth DMA operation (along with potentially other information from subsequent commands not shown). Here again as in FIG. 2A previously, the DMA operations are then forwarded for processing.

In additional embodiments, the initiator processor may be adapted to perform tuning and resource calculations to determine an optimal number of partial records to prefetch for search and for write operations. The minimum of the optimal records and the number of records on the track and the number of operations in the locate record are performed.

The record header and buffers for the keys require memory resource to hold the data across CCW operations. Managing individual buffers can be inefficient. Most CKD tracks have fewer than 32 records, so header buffers may be defined to contain 32 records. A track requires at most 3 record header buffers. The location of the header of record N is always buffer N/32 and position N mod 32 within that buffer.

Key fields contain at most 255 bytes, so two tracks worth of key fields can be contained in a single 64 KB data buffer. In some I/O schemes, operations are optimized for 64 KB operations so a data buffer is allocated to handle key operations.

The key for record N in a track is always at offset N*256 within the data buffer. In view of the above, the mechanisms of the present invention allow for improved memory utilization and performance.

Figure 4:
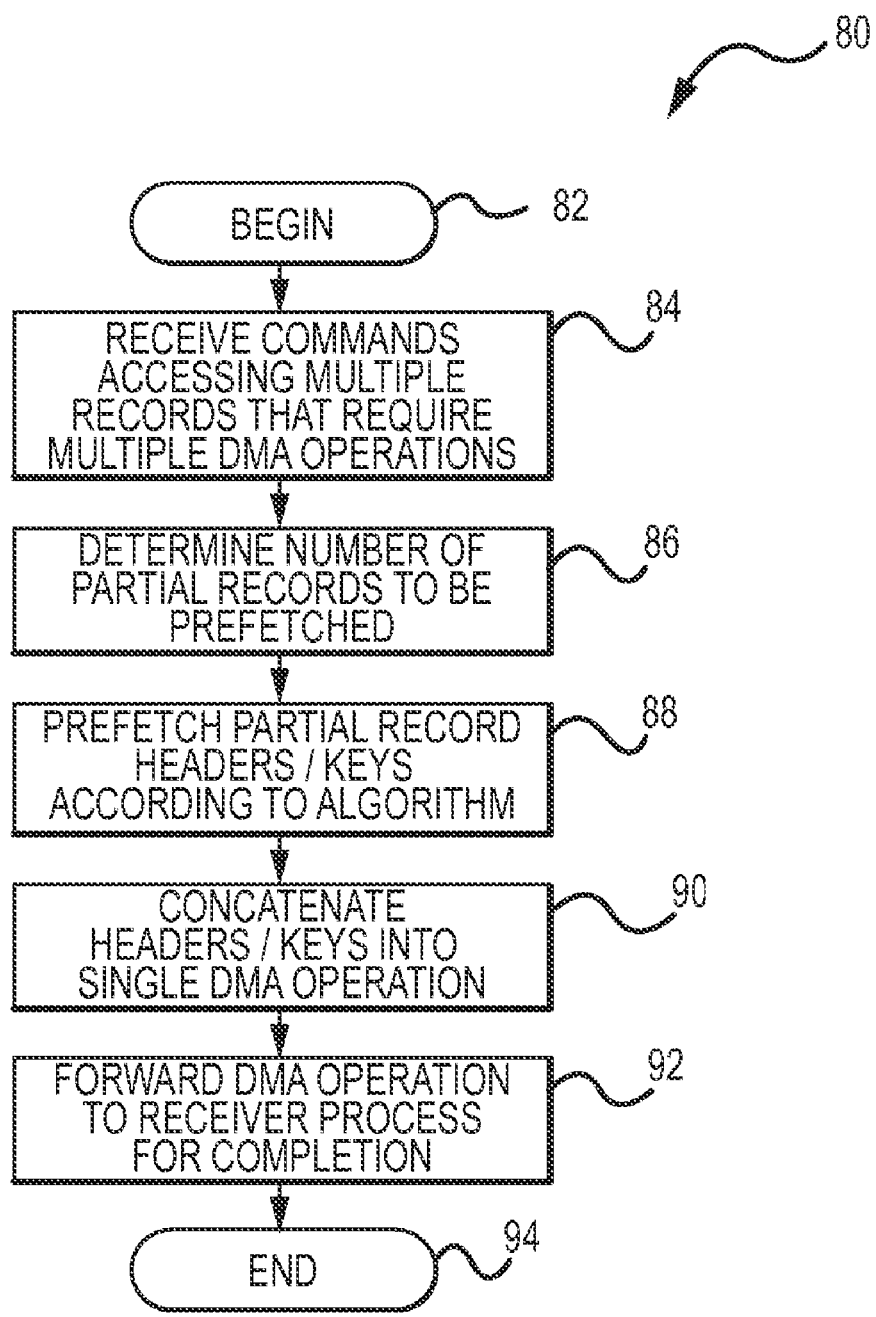
FIG. 4 depicts an exemplary method for performing partial record handling.

FIG. 4, following, depicts an exemplary method 80 for performing partial record handling as previously described. As one skilled in the art will appreciate, various steps in the following method may be implemented in differing ways and orders to suit a particular application. In addition, the described method may be implemented by various means, such as hardware, software, firmware, or a combination thereof operational on or otherwise associated with the processing environment. For example, the method may be implemented, partially or wholly, as a computer program product including a computer-readable storage medium having computer-readable program code portions stored therein. The computer-readable storage medium may include disk drives, flash memory, digital versatile disks (DVDs), compact disks (CDs), and other types of storage mediums.

Method 80 begins (step 82) with the receipt of multiple commands that access multiple records that require multiple DMA operations (step 84). The initiator processor, based on predetermined algorithms such as those previously described, determines a number of partial records to be prefetched (step 86). At least one of record header and record key information is prefetched according to the algorithm (step 88). The record header and record key information is concatenated into a single DMA operation (step 90). The DMA operation is then forwarded to a receiver process (e.g., DMA engine) for completion (step 92). The method 80 then ends (step 94).

While one or more embodiments of the present invention have been illustrated in detail, the skilled artisan will appreciate that modifications and adaptations to those embodiments may be made without departing from the scope of the present invention as set forth in the following claims.

What is claimed is:

1. For a count key data (CKD) protocol in a computer environment, a method for combining partial records into a single direct memory access (DMA) operation, the method comprising: determining in an initiator processor of the computer environment a number of the partial records to be prefetched by gathering a plurality of descriptor information for one of a search key command and a search identification (ID) search command, according to a predetermined algorithm having a plurality of assumptions for the one of the search key command and the search ID search command; prefetching the number of partial records; concatenating at least one of record headers and record keys of the number of partial records together into the single DMA operation; and forwarding the DMA operation to a receiver process to be completed,
wherein the predetermined algorithm having the plurality of assumptions for the one of the search key command and the search ID search command includes at least one of: a first assumption that two search commands are considered consecutive if the two search commands are a same search command, a second assumption that the two search commands are not consecutive if separated by a different command, a third assumption that a first search command does not require access to more than one record, and a fourth assumption that a second and a subsequent search command will not be satisfied by a succeeding record.

2. The method of claim 1, further including, for the search ID search command, prefetching only the record headers of the number of partial records.

3. The method of claim 1, further including, for the search key command, prefetching the record headers and the record keys of the number of partial records.

4. The method of claim 1, wherein the one of the search key command and the search ID search command is a write command, and the descriptor information identifies at least one write record to be accessed by the write command, the at least one write record containing the record headers and record keys to be prefetched.

5. The method of claim 4, further including examining at least one of locate record parameters and device command word (DCW) lists to gather the descriptor information.

6. The method of claim 1, further including performing a tuning calculation for the one of the search key command and the search ID search command to determine an optimal number of the partial records to be prefetched.

7. For a count key data (CKD) protocol in a computer environment, a system for combining partial records into a single direct memory access (DMA) operation, the method comprising: an initiator processor operable in the computer environment, the initiator processor adapted for: determining a number of the partial records to be prefetched by gathering a plurality of descriptor information for one of a search key command and a search identification (ID) search command, according to a predetermined algorithm having a plurality of assumptions for the one of the search key command and the one of the search ID search command, prefetching the number of partial records, concatenating at least one of record headers and record keys of the number of partial records together into the single DMA operation, and forwarding the DMA operation to a receiver process to be completed,
wherein the predetermined algorithm having a plurality of assumptions for the one of the search key command and the search ID search command includes at least one of: a first assumption that two search commands are considered consecutive if the two search commands are a same search command, a second assumption that the two search commands are not consecutive if separated by a different command, a third assumption that a first search command does not require access to more than one record, and a fourth assumption that a second and a subsequent search command will not be satisfied by a succeeding record.

8. The system of claim 7, wherein the initiator processor is further adapted for, for the search ID search command, prefetching only the record headers of the number of partial records.

9. The system of claim 7, wherein the initiator processor is further adapted for, for the search key, prefetching the record headers and the record keys of the number of partial records.

10. The system of claim 7, wherein the one of the search key command and the search ID search command is a write command, and the descriptor information identifies at least one write record to be accessed by the write command, the at least one write record containing the record headers and record keys to be prefetched.

11. The system of claim 10, wherein the initiator processor is further adapted for examining at least one of locate record parameters and device command word (DCW) lists to gather the descriptor information.

12. The system of claim 7, wherein the initiator processor is further adapted for performing a tuning calculation for the command to determine an optimal number of the partial records to be prefetched.

13. A computer program product for combining partial records into a single direct memory access (DMA) operation, the computer program product comprising a computer-readable non-transitory storage medium having computer-readable program code portions stored therein, the computer-readable program code portions comprising: a first executable portion for determining in an initiator processor of the computer environment a number of the partial records to be prefetched by gathering a plurality of descriptor information for one of a search key command and a search identification (ID) search command, according to a predetermined algorithm having a plurality of assumptions for the one of the search key command and the search ID search command; a second executable portion for prefetching the number of partial records; a third executable portion for concatenating at least one of record headers and record keys of the number of partial records together into the single DMA operation; and a fourth executable portion forwarding the DMA operation to a receiver process to be completed, wherein the predetermined algorithm having a plurality of assumptions for the one of the search key command and the search ID search command includes at least one of: a first assumption that two search commands are considered consecutive if the two search commands are a same search command, a second assumption that the two search commands are not consecutive if separated by a different command, a third assumption that a first search command does not require access to more than one record, and a fourth assumption that a second and a subsequent search command will not be satisfied by a succeeding record.

14. The computer program product of claim 13, further including a fifth executable portion for, for the search ID search command, prefetching only the record headers of the number of partial records.

15. The computer program product of claim 13, further including a fifth executable portion for, for the key search command, prefetching the record headers and the record keys of the number of partial records.

16. The computer program product of claim 13, wherein the one of the search key command and the search ID search command is a write command, and the descriptor information identifies at least one write record to be accessed by the write command, the at least one write record containing the at least one of record headers and record keys to be prefetched.

17. The computer program product of claim 16, further including a fifth executable portion for examining at least one of locate record parameters and device command word (DCW) lists to gather the descriptor information.

\* \* \* \* \*